(12) United States Patent
Leemet et al.

(10) Patent No.: US 8,825,001 B2
(45) Date of Patent: Sep. 2, 2014

(54) CONFIRMATION BASED MOBILE MESSAGING PLATFORM

(75) Inventors: Jaan Leemet, Dollard des Ormeaux (CA); Daniel Rudich, Dollard-des-Ormeaux (CA)

(73) Assignee: Tangoe Canada, Inc. (CA)

( * ) Notice: Subject to any disclaimer, the term of this patent is extended or adjusted under 35 U.S.C. 154(b) by 118 days.

(21) Appl. No.: 13/599,942

(22) Filed: Aug. 30, 2012

(65) Prior Publication Data

US 2013/0059561 A1 Mar. 7, 2013

Related U.S. Application Data

(60) Provisional application No. 61/531,381, filed on Sep. 6, 2011.

(51) Int. Cl.
*H04M 11/00* (2006.01)
*H04M 15/00* (2006.01)
*H04L 12/14* (2006.01)
*H04W 4/24* (2009.01)

(52) U.S. Cl.
CPC .............. *H04M 15/43* (2013.01); *H04M 15/88* (2013.01); *H04M 15/84* (2013.01); *H04M 15/858* (2013.01); *H04L 12/141* (2013.01); *H04M 15/855* (2013.01); *H04W 4/24* (2013.01); *H04M 15/881* (2013.01); *H04M 15/85* (2013.01); *H04M 15/8038* (2013.01); *H04M 15/83* (2013.01)
USPC ..... 455/405; 455/414.1; 455/406; 455/412.2; 455/432.1

(58) Field of Classification Search
USPC ............................ 455/406, 405, 432.1, 412.2
See application file for complete search history.

(56) References Cited

U.S. PATENT DOCUMENTS

| | | | |
|---|---|---|---|
| 6,122,671 A | 9/2000 | Farrar, Jr. et al. | |
| 7,167,699 B1 * | 1/2007 | Kretsinger | 455/405 |
| 7,420,920 B2 * | 9/2008 | True et al. | 370/235 |
| 7,657,250 B2 * | 2/2010 | Clayton | 455/407 |
| 8,422,988 B1 * | 4/2013 | Keshav | 455/405 |
| 2002/0107051 A1 | 8/2002 | An | |
| 2006/0276180 A1 * | 12/2006 | Henry, Jr. | 455/412.2 |
| 2007/0099609 A1 * | 5/2007 | Cai | 455/428 |
| 2007/0277120 A1 | 11/2007 | Wilson et al. | |
| 2009/0054030 A1 * | 2/2009 | Golds | 455/406 |
| 2009/0068984 A1 * | 3/2009 | Burnett | 455/408 |
| 2010/0017506 A1 * | 1/2010 | Fadell | 709/224 |
| 2010/0063884 A1 * | 3/2010 | Aaron et al. | 705/14.66 |
| 2010/0330954 A1 * | 12/2010 | Manning Cassett et al. | 455/405 |
| 2011/0151831 A1 * | 6/2011 | Pattabiraman | 455/405 |
| 2012/0198046 A1 * | 8/2012 | Shah et al. | 709/224 |
| 2012/0276867 A1 * | 11/2012 | McNamee et al. | 455/406 |
| 2013/0023230 A9 * | 1/2013 | Momtahan et al. | 455/405 |

* cited by examiner

*Primary Examiner* — Kamran Afshar
*Assistant Examiner* — Mong-Thuy Tran
(74) *Attorney, Agent, or Firm* — St. Onge Steward Johnston & Reens LLC

(57) ABSTRACT

The present invention relates to a system and method for delivering a message to and receiving an acknowledgement from a mobile device, and more specifically, the system and method allows network operators, or any central administration group(s) to issue messages and warnings to a mobile device, which requires an acknowledgement in order for the mobile device to continue functioning without restriction.

33 Claims, 9 Drawing Sheets

CONFIRMATION BASED MOBILE MESSAGING PLATFORM

CROSS-REFERENCE TO RELATED APPLICATIONS

The present application claims the benefit under 35 U.S.C. §119 (e) of the U.S. Provisional Patent Application Ser. No. 61/531,381 filed on Sep. 6, 2011.

FIELD OF THE INVENTION

The application relates to a mobile messaging platform designed to provide feedback to a sender of a message; and more specifically, to a system and method of sending a message to a mobile device and forcing acknowledgement and confirmation of receipt of the message.

BACKGROUND OF THE INVENTION

Today, network operators, carriers and service providers (collectively referred to as "service providers") provide services to their customers via a contract that involves a service plan that outlines how much data, voice, or texting (SMS) is allowed in an allotted time-frame or billing cycle (typically a month), along with the costs associated with using the services within the established guidelines in the plan. Also provided in the service plan are any additional costs for activities that exceed the service plan parameters, such as, for example, going over the service plan limits (overages) or going off network (roaming). The costs of going over the pre-established limits can be very high, and a small overage (<10%) can actually double the cost of the initial plan. An even smaller overage (<1%) can double the plan cost if off network or roaming.

To avoid such events, some network operators have employed a number of existing systems, such as, for example, SMS messaging and physically mailed letters via overnight courier to warn users and companies that they have exceeded the limits of their service plans.

However, none of these methods are fail safe ensuring that the user has actually received notice of the service plan overage(s). As the speed of communication networks has increased dramatically, the rate at which overage or roaming charges can accumulate has increased exponentially. This is especially so in view of the dramatic increase in data usage with smart phone devices in the past few years. Any system that adds even minutes of delay to the notification process, can lead to a large unexpected overage(s) for the user/company.

Such overages can be extremely costly to the user. Additionally, if the user disputes the overage(s), based on, for example, lack of notification or knowledge of the potential charges, the service provider could have to spend an inordinate amount of time dealing with the dispute and may not prevail. In any event, even if the service provider is able to collect the excess fees, a situation develops where the user is dissatisfied with the service provided.

Some systems have been provided that seek a confirmation from a user including U.S. Patent Application Publication No. 2007/0277120 (the '120 application). The '120 application deals with prompting users for confirmations for actions initiated on the device. The '120 application, however, fails to disclose or teach that an audit trail of actions/acknowledgements by the user is maintained or stored. Accordingly, the '120 application would not address the problem of ensuring and providing verifiable notice to the service provider that the user is actually notified of any potential increase in fees for out of service plan usage. Additionally, the '120 application does not provide any flexibility for the user to selectively deactivate services based a notification. In other words, the user would not be able to mitigate the potential increase in costs for out of plan usage short of simply turning the device completely off.

U.S. Patent Application Publication No. 2002/0107051 (the '051 application) is directed toward a method for sending a message to a mobile device. The '051 application is directed toward a system to acknowledge user initiated messages that have been generated on the mobile device and obtaining an acknowledgement from a remote server side or application side system. However, the '051 application fails to disclose or teach a system that will prompt the user to acknowledge a message that is automatically generated based on a select criteria (e.g., reach a voice/data/SMS service plan limit, etc.). Likewise, the '051 application also fails to disclose or teach a system that allows for an audit trail or for the flexibility for the user to selectively deactivate services based a notification.

U.S. Pat. No. 6,122,671 (the '671 patent) mentions user acknowledgment for specific messages. However, the '671 patent, like the above-listed published applications, fails to disclose or teach a system that provides for the receipt and storing of any sort of audit trail of actions/acknowledgements by the user. Nor does the '671 patent provide any flexibility for the user to selectively deactivate services based a notification. As such, the '671 patent is deficient for all the reasons stated above in connection with the cited published patent applications.

What is needed, therefore, is a more effective alert mechanism for alerting a user to potential increases in fees for out of service plan usage; and a more effective recording mechanism for providing feedback to the service provider that the user acknowledges that out of service plan usage fees will begin accruing.

SUMMARY OF THE INVENTION

It is therefore an object of the invention to provide a system and method that ensures that the user is notified of any potential increase in fees for out of service plan usage.

It is also an object of the invention to provide a system and method that that promptly provides an alert to a user before any potential increase in fees for out of service plan usage begin accruing.

It is also an object of the invention to provide a system and method that that provides subsequent notifications at predetermined monetary or usage based intervals, for example, each one hundred dollars of additional overage.

It is further desired to provide a system and method that ensures that a user actually acknowledges any potential increase in fees for out of service plan usage.

It is still further desired to provide a system and method that allows a service provider to be provided with and to save a user acknowledgement of a notification (an audit trail) for potential additional fees for out of service plan usage.

It is also desired to provide a system and method that informs a user of potential charges before such charges accrue and allow the user maximum flexibility to select which, if any, services the user desires to continue using beyond the service plan limit.

According to the above-listed and additional objects, a system and method is provided wherein a user is forced to acknowledge a notification displayed on the mobile device apprising the user that further mobile device activity will result in fees for out of service plan usage. The notification can provide a fee estimate in the notification itself or could provide a link to a location where the user could see the potential charges for usage of the mobile device going forward.

It is important that the notification be provided to the user before the user begins accruing out of service plan fees, which can escalate very quickly. To that end, it is contemplated that a detection mechanism may, for example, be provided on the mobile device to detect when threshold events (reach voice/data/SMS limit) occur. This monitoring could be accomplished though local monitoring or through monitoring a remote server/network based signal or event, which would then trigger a display of a blocking pop-up message on the mobile device requiring the user to acknowledge any potentially costly events.

In doing so, the user and the operator are both apprised of the possible overage charges before such charges accrue, and a record may be kept of the acknowledgement(s) or confirmation(s) received. Further, as charges continue to occur when using the costly service or network, the accumulated costs can be repeatedly shown with a repeat confirmation message to continue using the services and the user warned as cost or usage thresholds have been crossed (i.e. such as for each 50$ or for each 1 MB, etc.). Accordingly, it is contemplated that the notification(s) may be directed toward charges for roaming, charges for plan limit and threshold crossings, premiums services (increased bandwidth, premium content, etc.) or even for promotional and up-sell capabilities. Notification prior to the possible overage charges before the charges accrue can be received by the entity responsible for payment of the charge, including for example, a notification sent to an employer or parents of a child using the mobile device.

It should further be understood that the monitoring and notification of the mobile device may occur either locally on the mobile device itself (e.g. software is installed on the device where monitoring is performed and the notification originates on and is generated on the mobile device) and the user's acknowledgement may then be saved on the mobile device and/or sent to the service provider via a network connection to be stored by the service provider. Alternatively, the monitoring could be done over the wireless network where the notification is generated and sent to the mobile device. The user acknowledgement could then be saved locally on the mobile device and/or sent to the service provider via the network connection.

It is further contemplated that the forced response to the notification(s) may include a number of options, such as, for example, Agree/Disagree, Yes/No, or other. If the user selects the "Disagree", "No" or "Other" option, actions including disabling some services can be performed when the user selects to disagree to some or all of the terms and conditions in the message. An audit trail of user actions may be stored on the server/network of which selection was made.

It is understood that various means may be used to receive the user input including, hyperlinks in the message itself, or a menu/button/or other Graphic User Interface (GUI) construct as a response. This could include, the entry of alphanumeric text or selections of a message to the server/operator such as the selection from a set of available plans etc.

It will be understood that the notification and confirmation system and method described herein may be used for many differing applications in addition to confirmation of out of service plan usage. For example, companies and families can use such a messaging/notification system for getting acknowledgements from their employees and family members or friends. Many additional uses will be apparent to those of skill in the art.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

The terms "process" and "processing" as used herein each mean an action or a series of actions including, for example, but not limited to, the continuous or non-continuous, synchronous or asynchronous, direction of data, modification of data, formatting and/or conversion of data, tagging or annotation of data, measurement, comparison and/or review of data, and may or may not comprise a program.

In one advantageous embodiment, a system for delivering messages to and receiving confirmation of the received message from a mobile device is provided, the system comprising communication equipment coupled to and sending data to and receiving data from the mobile device, and a monitoring module having thresholds set therein. The monitoring module monitors usage of the mobile device, wherein when a threshold is reached, the monitoring module generates a notification that is presented on the mobile device. The system further comprises a server coupled to the communication equipment and having a storage coupled thereto. The system is provided such that the notification requires an acknowledgement thereto and when the acknowledgement to the notification is entered the acknowledgement is saved on said storage to generate an audit trail of the acknowledgement.

In another advantageous embodiment, a method for delivering messages to and receiving confirmation of the received message from a mobile device is provided comprising the steps of defining a threshold relating to at least one function relating to the mobile device, and monitoring the at least one function to determine if the threshold is reached. The method is provided such that if the threshold is reached, a notification is automatically generating relating to the threshold. The method further comprises the steps of presenting the notification on the mobile device such that the notification may be viewed by a user, restricting usage of the mobile device at least until the notification is acknowledged, and saving the acknowledgement in a storage to generate an audit trail of the acknowledgement.

Other objects of the invention and its particular features and advantages will become more apparent from consideration of the following drawings and accompanying detailed description.

DETAILED DESCRIPTION OF THE INVENTION

Figure 1:
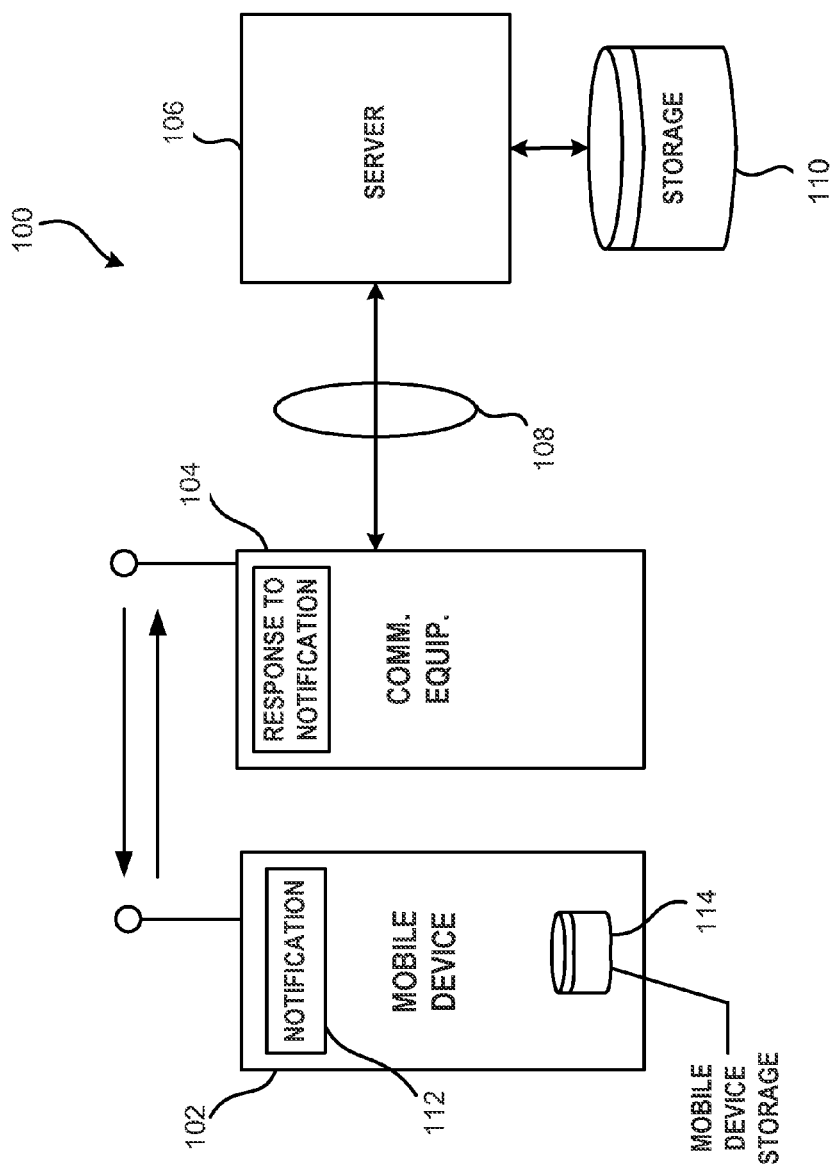
FIG. 1 is a block diagram of an advantageous embodiment of the present invention.

The present invention relates to the system of showing a message (pop up) or notification requiring acknowledgement thereto from a user of the mobile device. In one advantageous embodiment of the present invention, some or all of the functions of the mobile device are restricted until the message or notification is acknowledged.

The above-listed functionality is achieved, in one advantageous embodiment, through the implementation of two components, (a) a device software agent (a module) which runs on the mobile device, and (b) a server component that runs in the operator network or in a remote server which can establish a communications channel with the mobile device.

Device software agent. On the mobile device, a software agent is created and run that is able to capture trigger events for determining if a message or notification is to be displayed on the mobile device. These events could include the reception of a message request from a remote server along with methods and capabilities to establish such a connection and a protocol upon which to transfer data over the connection.

Events could also be generated local to the device and would include triggers from the mobile device, such as, statistics counters or events generated by a local monitoring service. Examples of these could include, but are not limited to: the establishment of a connection to a roaming network, and the passing of a usage threshold for data/voice/SMS.

Another component which must be implemented on the client application is a method to display messages or notification, which will block other activities and inputs on the mobile device, typically implemented as a modal dialog or message displayed in the foreground of all currently running applications. Only after the message or notification has been acknowledged would the mobile device be unblocked. Alternatively, the user could have the option to restrict any or all the functionality of the mobile device based upon the message or notification.

Finally, the message display routines are complemented by an input routine that captures a user input through, for example, capturing of a button press, or a keyboard or soft key event requiring user intervention. In the case of a server generated event, the message protocol also defines the message or notification to be displayed, as well as the options and resultant actions presented to the user for consideration and selection.

Once the user has created their input (e.g., by selecting, or pressing a button, or entering a soft-key, etc.), the data result is captured, encoded and stored in an archive area. When using a server based solution, this result may be sent back to the server either, in the same communication session, in a later session, or in a batch method for archiving.

Typically, this function would run as a background task on the device (e.g., running as an agent/daemon service or similar) such that it is able to capture various triggers in real time from the mobile device or from the network.

Server Component.

A software program running either in the cloud, at the operator, or in an enterprise. This server component provides a method to generate appropriate triggers. Examples include but are not limited to, triggers generated via a billing system, manual operator intervention, or other external triggers: the simplest case being simply someone, such as a parent, wanting to send a message requiring acknowledgement from a child. Each of these triggers, in essence, either creates or selects a message for distribution to one or more mobile devices.

The server program may implement a protocol and mechanism for sending a message or notification to a mobile device. This can be any existing mechanism (e.g., cellular radio, wi-fi connection, or other wireless means to reach the device) using an existing protocol (tcp/ip, udp, email, SMS, oob messaging, etc.). Alternatively, the server could also wait for mobile devices to connect periodically to deliver these messages or notifications and maintain them in a queue for the next available opportunity for delivery.

Once the message or notification is delivered to the mobile device, the server will be prepared to receive the acknowledgement or answer from the mobile device. This method can be done out-of-band and asynchronously, as the user may delay his response. The server should therefore have a method to match the pending notifications with acknowledgements received, and then, archive them for later access as desired.

The messaging system could also be extended to include additional features, and is not limited to the restriction of, for example, only services. In another example, a parent could use this system to send a message to their child and force the child to acknowledge the message as the mobile device would be inoperable until the notification is acknowledged/answered. Also, an employer could send a message to their employees requiring confirmation; or a carrier/operator could send a message to a subscriber forcing acceptance of charges for extended services out of the service plan.

It is also important to note that from an operator standpoint, the system and methods described above provide a mechanism to communicate with a mobile device even while the mobile device may be out of the home network carrier area in a partner or a roaming network area. Additionally, the system and method described above will be able to restrict or prevent services from being used on the mobile device when the mobile device is in a roaming area even when the operator network equipment could not directly disable or restrict services because the mobile device is being cared for by the equipment in the roaming area. An operator can therefore, initiate actions on the mobile device that through forced acknowledgement of the notification or selection of an option in the message or notification can restrict or limit some or all the features or services of the mobile device. The operator will also have control over the services and selections offered to the user and may restrict certain options based on credit history or current account activity, etc.

Referring now to the drawings, wherein like reference numerals designate corresponding structure throughout the views.

FIG. 1 is a block diagram of a system 100 for delivering messages to and receiving confirmation of the received message from a mobile device 102. The mobile device 102 is in wireless communication with communication equipment 104, which may belong to, for example, a home network carrier. The communication equipment 104 in turn, is coupled to server 106 via a network connection 108, which may comprise an Internet connection. Additionally, the server 106 is coupled to a storage 110. Storage 110 may comprise any type of storage device for storing data including, for example, a optical drive, a magnetic drive, a solid state drive or solid state memory, a removable drive, etc.

Also depicted in FIG. 1 is a notification 112 shown on mobile device 102. The notification may comprise any type of notification as previously described including, but not limited to, information relating to: data usage, voice usage, SMS usage, camera usage, etc. The notification 112 is provided such that further use of the mobile device is restricted until the notification 112 is responded to or acknowledged. It is understood that the breadth of restriction can be set as desired. For example, if a threshold is reached relating to data usage, an application(s) may be restricted on the mobile device; or if a voice usage or an SMS usage threshold is reached, voice access or SMS access may be restricted completely or selectively (restriction to all phone numbers except selected allowed numbers, or restriction of only certain phone numbers, etc.).

Also depicted is a mobile device storage 114 that is illustrated on mobile device 102. Upon acknowledging the notification 112, the response or acknowledgement is sent to communication equipment 104, which is then transmitted on to server 106. The acknowledgement can then be saved in storage 110, which generates an audit trail.

Figure 2:
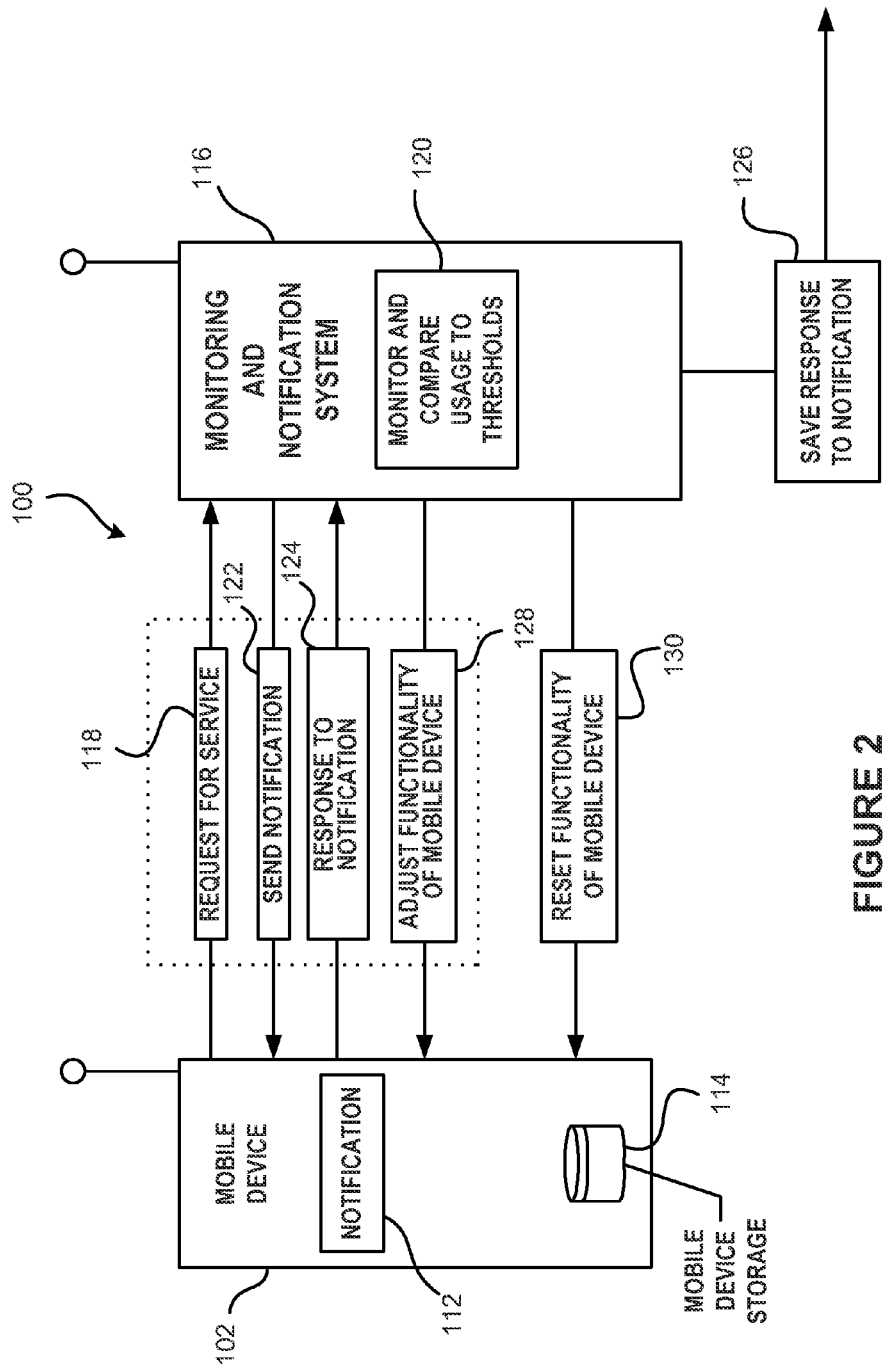
FIG. 2 is a block diagram of an advantageous embodiment of the present invention according to FIG. 1.

Referring now to FIG. 2, an advantageous embodiment of the present invention is illustrated showing the interchange of various information between mobile device 102 and monitoring and notification system 116 (which could comprise in one embodiment, communication equipment and a server(s) with associated storage).

It is contemplated that a user may request a service 118 by, for example, using the mobile device 102 (e.g., access data, SMS, etc.). The monitoring and notification system can determine if the mobile device has reached a threshold (e.g., a predefined limit of minutes in billing cycle for voice, a predefined limit of data for billing cycle, a predefined limit of text messages, etc.). It should be noted that the predefined limit could directly correlate to the maximum in plan amount for the user during a billing cycle of a service plan, or any predefined limit. Accordingly, the monitoring and notification system 116 will monitor and compare usage to thresholds 120. If a threshold is reached, monitoring and notification system 116 will send a notification 122 to mobile device 102. The notification 112 is then prominently displayed on the mobile device 102 for the user to see. Additionally, the mobile device 102 may be restricted (e.g., some or all functionality of the mobile device may be limited) until the notification 112 is acknowledged. The user may then respond to the notification 124, which can be sent to the monitoring and notification system 116. The monitoring and notification system 116 may then save the response to the notification 126 in a storage to generate and audit trail of responses by the user.

The monitoring and notification system 116 may also adjust some or all of the functionality 128 of the mobile device. This adjustment may be based upon the response to the notification. For example, the response may include information from user declining to accept additional charges for data usage out of the service plan limits. In this case, the data functionality may then be disabled or turned off to avoid accruing any additional charges out of plan. Alternatively, the user may accept the out of plan charges in which case, the functionality will be maintained. Still further, the user could define a limit on additional cost up to which the function would work and then be restricted. This could applied to virtually any function on the mobile device 102.

Also illustrated is the reset of functionality 130 of the mobile device. It is contemplated that the mobile device 102 functionality may, for example, be reset such that restrictions are removed. This could occur by, for example but not limited to, the user contacting the provider to remove the restrictions, or this could occur automatically based on the user's payment of a bill or response to a communication, or automatically at the beginning of a new billing cycle.

FIG. 2 therefore illustrates one advantageous embodiment of a network based monitoring and notification system. It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein. Additionally, it will be noted that a dashed box surrounding the request for service 118, send notification 120, response to notification 122 and adjust functionality of mobile device 128 is shown in FIG. 2. This is to indicate that these steps or functions may occur repeatedly. For example, the user may request a service (e.g. download content from a source) that causing the mobile device 102 to exceed the data limit for the billing cycle. In this case, a notification is sent 122 to the mobile device 102 that must be acknowledged by the user as previously described. However, later in the same billing cycle, the user may attempt to send an SMS message that in aggregate for the billing cycle, would exceed the total amount allowed and would result in additional cost. Again, a the system would send a notification 122 that would have to be acknowledged by the user to proceed. Still further, various thresholds may be reached during a billing cycle that will result in a notification being sent to the mobile device (e.g., voice usage at 50%, data usage at 90%, only 20 MB of data transfer left in billing cycle, only 100 text messages left in billing cycle, and so on). All of this may be customizable by the user. Alternatively, the service provider could, depending on the user's credit and billing history, provide notifications to the mobile device.

Figure 3:
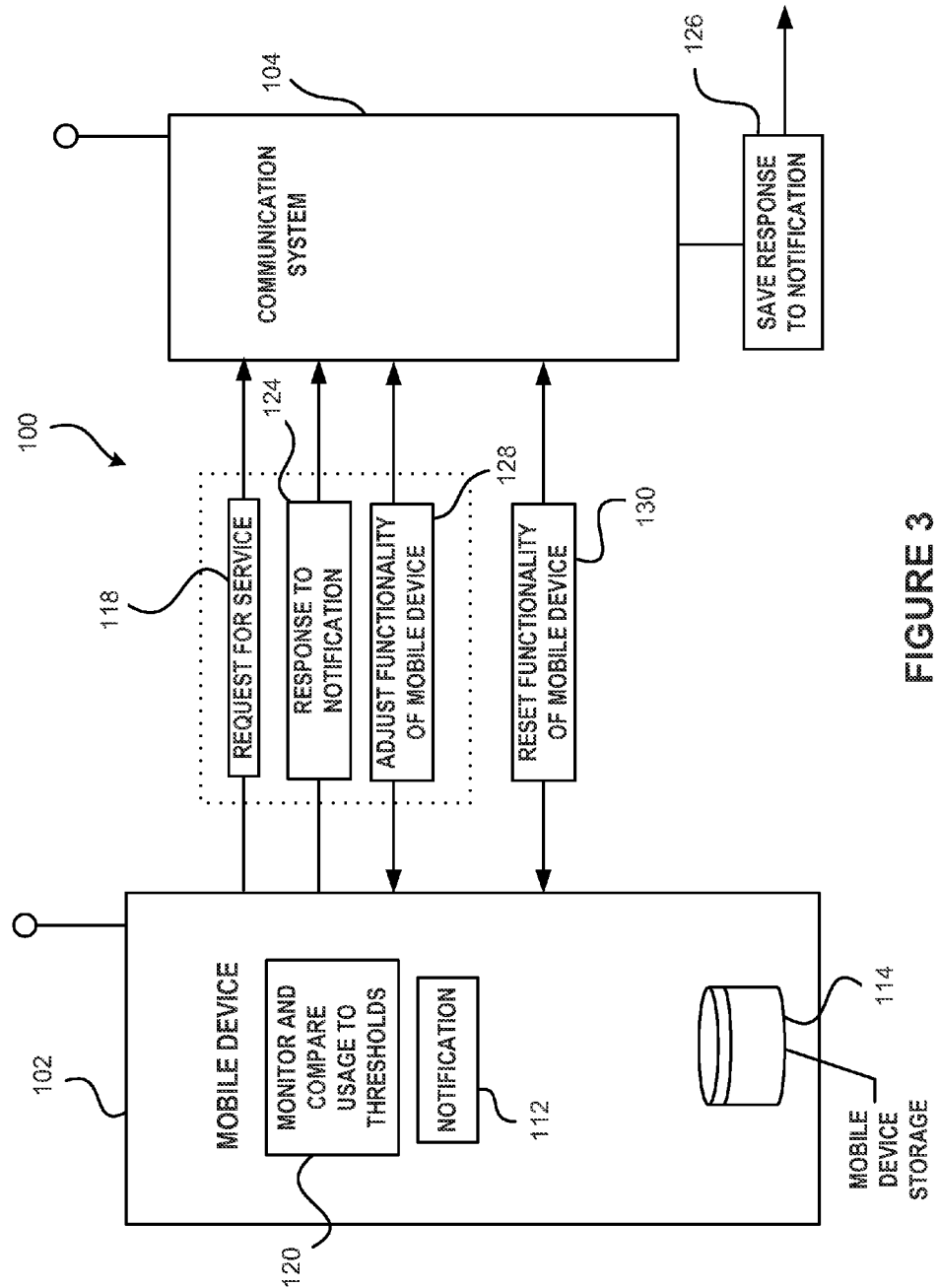
FIG. 3 is a block diagram of an advantageous embodiment of the present invention according to FIG. 1.

Turning now to FIG. 3, a standalone monitoring system on the mobile device 102 where a message or notification is generated on the mobile device 102 is illustrated. The actions of detecting costly behavior and later restricting costly behavior are all stand alone on the device itself.

The system functions similarly to that shown in connection with FIG. 2, except that the monitoring and generation of the notification occurs on the mobile device 102. The mobile device 102 is shown to monitor and compare usage to thresholds 120. It can be seen, however, that the response to the notification may also be sent to communication system 104 so that the response to the notification 126 may be saved to generate and audit trail. Additionally, the adjustment to the functionality of the mobile device 128 may come from the device itself based on the service plan parameters with a copy sent to the communication system 104. Likewise, the resetting of the adjustment of the mobile device functionality 130 is shown being able to be generated from, for example, an instruction generated on the device itself or from the communication system.

The remaining functionality of the system described in connection with FIG. 3 functions similarly to the system described in connection with FIG. 2.

Figure 4:
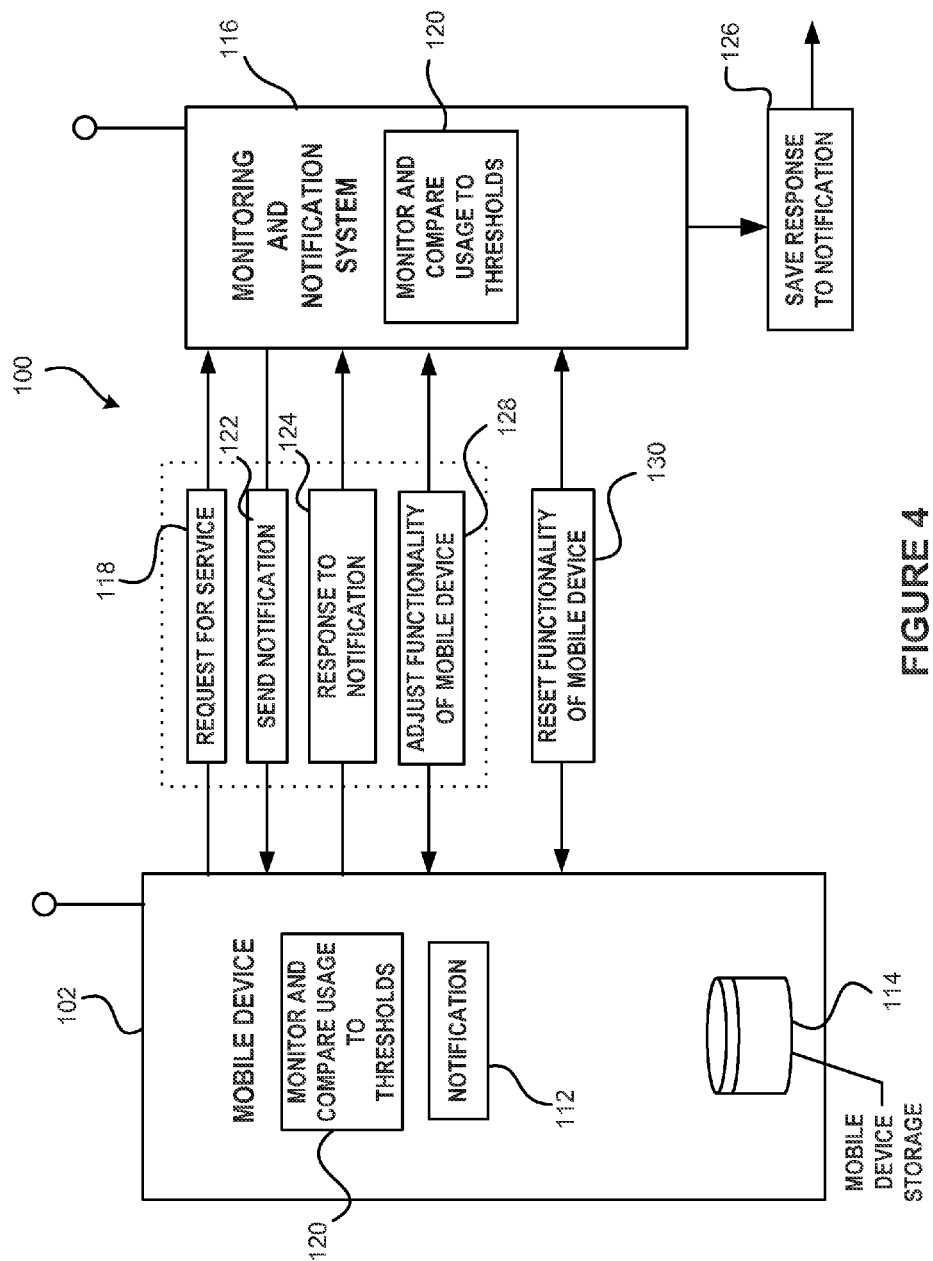
FIG. 4 is a block diagram of an advantageous embodiment of the present invention according to FIG. 1.

FIG. 4 is a combined method of using local alerts as well as network notifications where by the network may determine the messaging types but the triggers may be deployed from the device (or any combination of device(s) and server components to offer the complete solution).

In this embodiment, various features from FIGS. 2 and 3 are combined with monitoring and notifications being generated on either the device itself or the network, or both. For example, some notifications may be generated on the mobile device 102 itself, while other notifications are generated on the system and transmitted over the network. In one embodiment, the thresholds or triggers may be uploaded from the system via the network connection to be saved in the mobile device storage 114. A log of mobile device usage may also be stored in the mobile device storage 114. Notifications may be instantly displayed on the mobile device 102 when thresholds are reached even if there is intermittent connectivity with the system.

Figure 5:
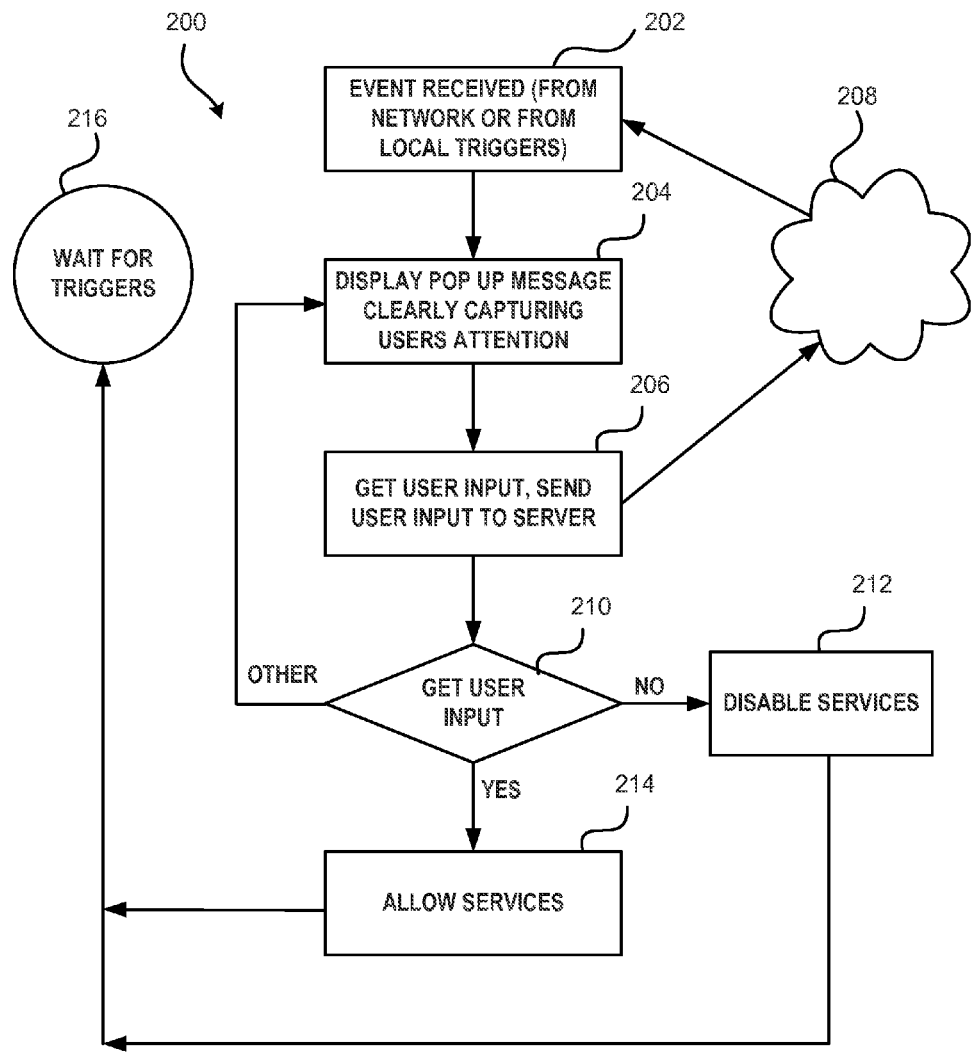
FIG. 5 is a flow diagram of an advantageous method according to the embodiment of the present invention of FIG. 1.
Figure 6:
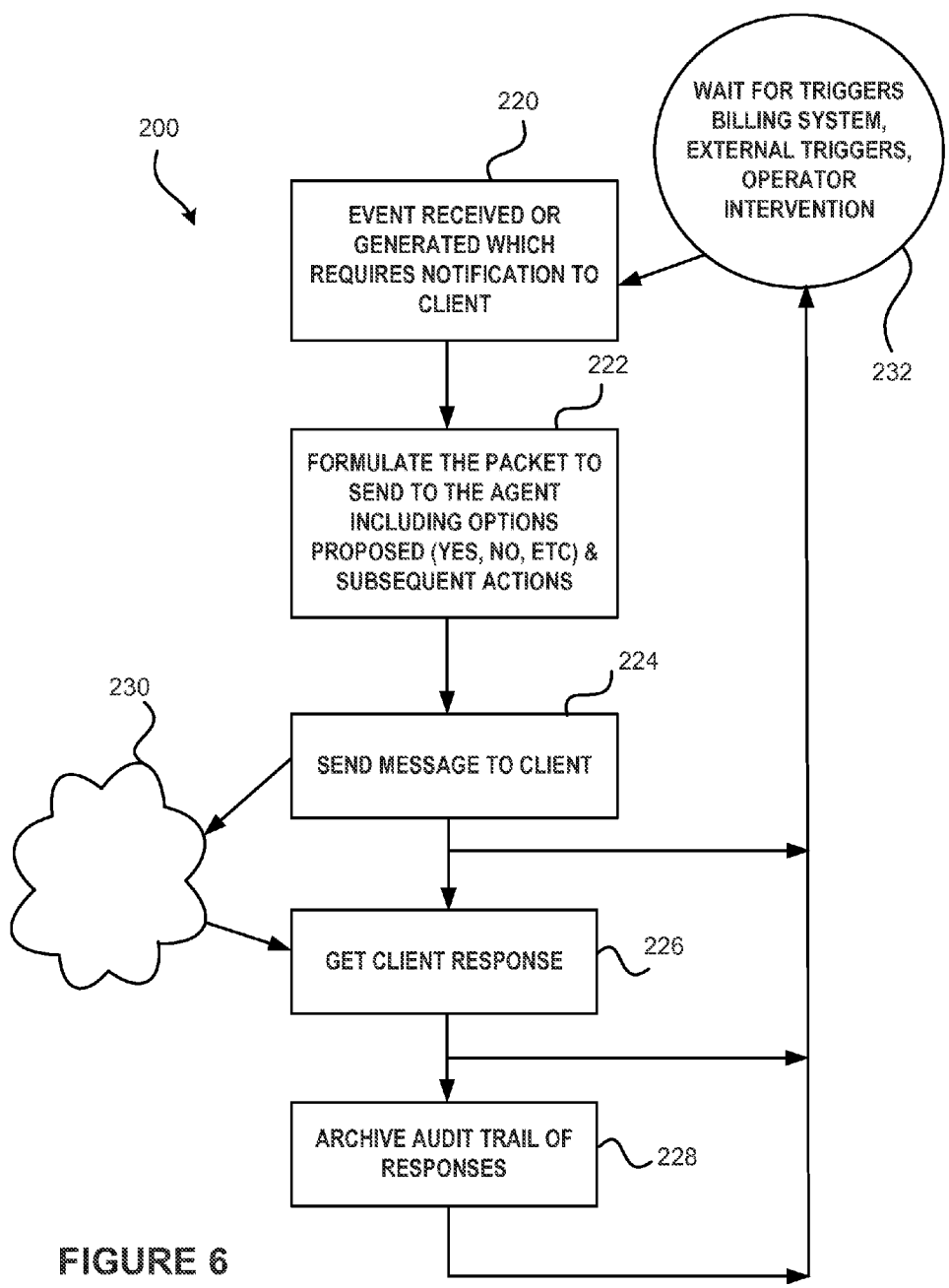
FIG. 6 is a flow diagram of an advantageous method according to the embodiment of the present invention of FIG. 1.

Referring now to FIG. 5, a flowchart is shown illustrating the processing engine and the method to generate messages or notifications and the required implementation to provide the functionality. FIG. 6 is a flowchart showing the processing engine in the server side to create and send the messages or notifications, and to process and archive the responses or acknowledgments.

In FIG. 5, a method 200 is provided where and event is received 202 either from a network or a local trigger/threshold. The mobile device displays a pop up message clearly capturing the users attention 204 and the mobile device gets or receives an input from the user that is sent to the server 206. A "cloud" 208 is shown in FIG. 5 to illustrate a network connection via, for example, the Internet.

A decision point labeled get user input 210 is further illustrated in FIG. 5. If a user input is not received, some or all of the services on the mobile device may be disabled 212. If a user input is received to allow services even though the notification states that the usage will be out of plan, then the services may be allowed 214. The system then may wait for triggers or thresholds to be reached 216. While FIG. 5 depicts disabling at step 212, it is understood that disabling of a function may occur prior to getting a user input at step 206. For example, if a user is downloading a large file and exceeds a threshold data usage limit, the device may stop or pause the download so as not to incur the overage prior to receiving the user input. If the user does not provide a timely response, the system may cancel the download or remain paused until the user provides input. It should be understood that the system may allow for maximum flexibility so as to allow for setting of user preferences as desired. Accordingly, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Referring now to FIG. 6, an embodiment of the server side functionality is discussed. In this example, an event is received or generated which requires notification to the client or user 220. This could be virtually anything, including the reaching of a trigger or threshold. The system may then formulate the packet to send to the agent including options proposed (Yes, No, Etc.) and subsequent actions 222. The subsequent actions could include any of the actions as previously discussed including the restriction of functionality either selectively or entirely. The message or notification is then sent to the mobile device 224 for receipt by the client. The system may then get or receive the client response 226 and archive an audit trail of responses 228. Again, a "cloud" 230 is shown in FIG. 6 to illustrate a network connection via, for example, the Internet.

Finally, the system waits for triggers or thresholds relating to various systems or inputs 232 to be reached.

Figure 7A:
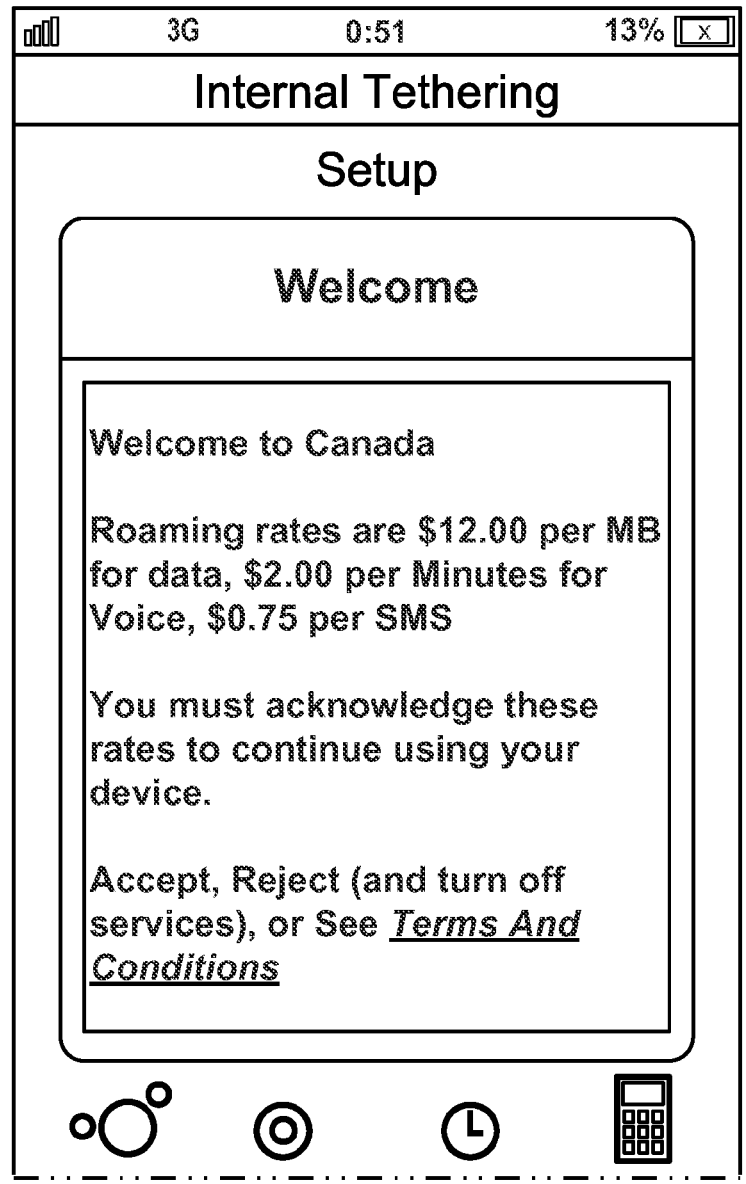
FIGS. 7A-7C are illustrations of screen shots depicting a notification according to the embodiment of the present invention of FIG. 1.
Figure 7B:
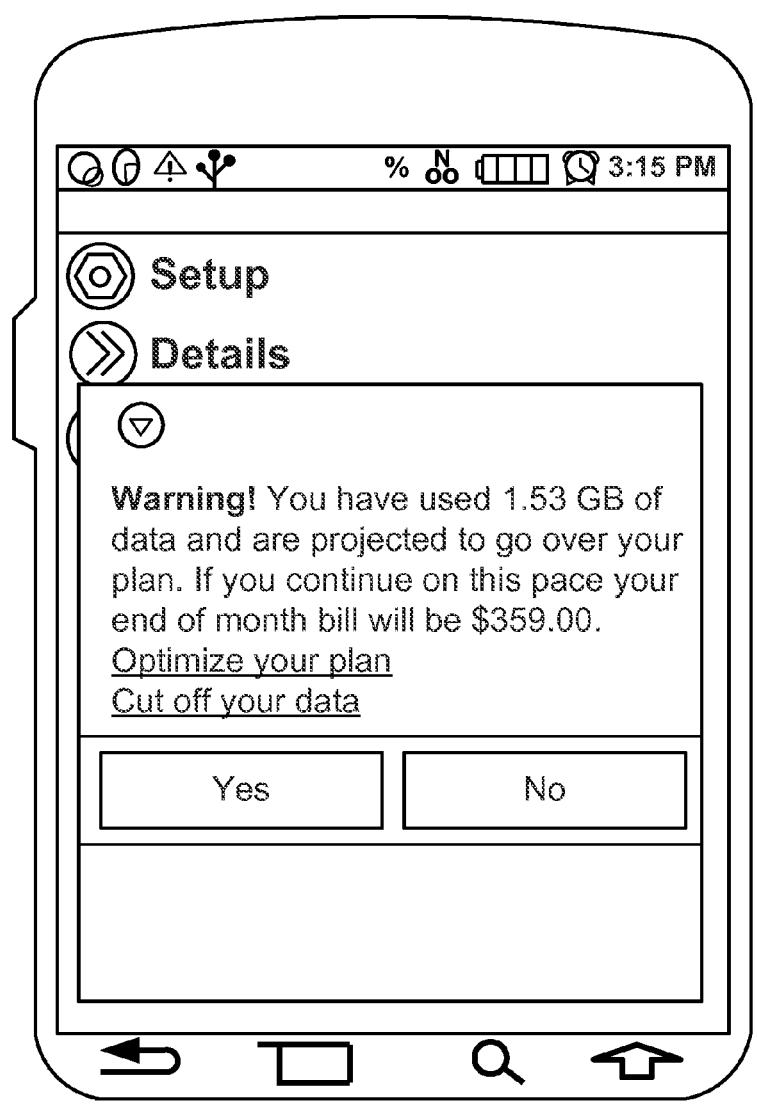
Figure 7C:
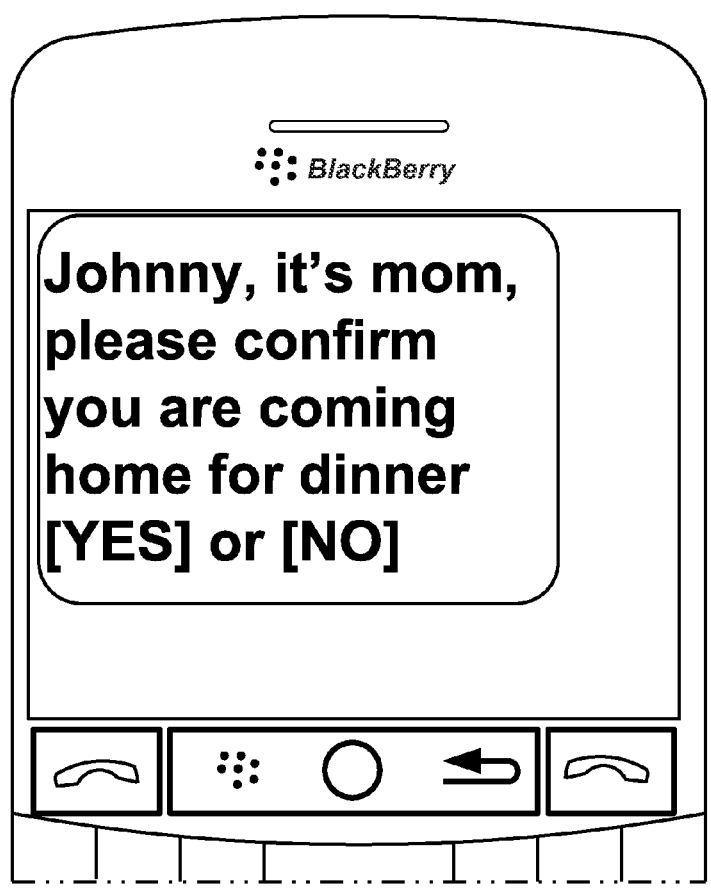

FIG. 7A-7C are examples of representation of how a mobile device may have as a pop up message when crossing a threshold or arriving in a roaming area or when presented with a promotional option. It should be noted that the buttons on the message force the selection of a choice or an acknowledgment described in the message or notification as well as the pop-up nature of the message which is overlaying all other text and applications on the device.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for delivering messages to and receiving confirmation of the received message from a mobile device, the system comprising:
   communication equipment coupled to and sending data to and receiving data from the mobile device;
   a monitoring module having thresholds set therein, said monitoring module monitoring voice and data usage of the mobile device, wherein when a threshold is reached for the monitored usage, said monitoring module generates a notification that is presented on the mobile device;
   a server coupled to the communication equipment and having a storage coupled thereto;
   wherein the notification requires an acknowledgement thereto such that the functionality of the mobile device associated with the threshold that has been reached is blocked until the acknowledgement is sent, and the acknowledgement is always saved on said storage to generate an audit trail of the acknowledgement.

2. The system according to claim 1 wherein the notification allows for multiple different responses thereto.

3. The system according to claim 2 wherein the multiple different responses allow or restrict at least one function of the mobile device.

4. The system according to claim 3 wherein the at least one function is selected from the group consisting of: data usage, voice usage, SMS usage, camera usage, and combinations thereof.

5. The system according to claim 4 wherein the thresholds are set based upon a service plan for the mobile device and the service plan defines the limits of the at least one function for a billing cycle.

6. The system according to claim 5 wherein at a beginning of a new billing cycle, if the at least one function has been restricted, the restriction is removed.

7. The system according to claim 4 wherein when the at least one function is selected as voice usage or SMS usage, the restriction of the at least one function is a restriction of communication with a particular phone number.

8. The system according to claim 4 wherein when the at least one function is selected as data usage, the restriction of the at least one function is a restriction of an application.

9. The system according to claim 1 wherein said monitoring module comprises software located on the mobile device.

10. The system according to claim 9 wherein the software triggers cost, usage, or service availability based notifications that require acknowledgement and prohibit use of the mobile device or some services on the mobile device until the acknowledgement is sent.

11. The system according to claim 1 wherein said monitoring module comprises software located remotely from the mobile device.

12. The system according to claim 11 wherein the software triggers cost, usage, or service availability based notifications that require acknowledgement and prohibit use of the mobile device or some services on the mobile device until the acknowledgement is sent.

13. The system according to claim 1 wherein a home network of a carrier provides data to the mobile device located in a roaming network, the data comprising cost information or other roaming related information, wherein the cost information or roaming related information is presented on the mobile device and must be acknowledged before operation of features of the device on the roaming network is allowed.

14. The system according to claim 1 wherein the storage device is located remotely from the mobile device and further comprising a mobile device storage located on the mobile device, wherein the acknowledgement is stored on the mobile device storage.

15. The system according to claim 1, wherein the thresholds comprise a plurality of successive thresholds, and when each successive threshold is reached for the monitored usage, said monitoring module generates a respective notification that is presented on the mobile device, wherein the respective notification requires an acknowledgement thereto such that the functionality of the mobile device associated with the respective threshold that has been reached is blocked until the acknowledgement is sent and the acknowledgement to the respective notification is always saved on said storage to generate an audit trail.

16. The system according to claim 15, wherein the threshold relates to a voice/data plan service limit, and the plurality of successive thresholds relate to costs associated with voice or data usage in excess of the voice/data plan service limit.

17. The system according to claim 16, wherein at least one of the respective notifications includes cost data.

18. A method for delivering messages to and receiving confirmation of the received message from a mobile device comprising the steps of:
defining a plurality of successive thresholds relating voice usage on the mobile device;
defining a plurality of successive thresholds relating to data usage on the mobile device;
monitoring both the voice and data usage to determine if any of either the voice usage thresholds or any of the data usage thresholds are reached; and
wherein, if any of the thresholds is reached, automatically generating a respective notification relating to the respective threshold reached;
presenting the respective notification on the mobile device such that the respective notification may be viewed by a user;
restricting usage of the mobile device at least until the respective notification is acknowledged; and
saving every acknowledgement to each respective notification in a storage to generate an audit trail of the acknowledgements.

19. The method according to claim 18 further comprising the steps of either allowing or restricting the at least one function of the mobile device.

20. The method according to claim 19 wherein the least one function is selected from the group consisting of: data usage, voice usage, SMS usage, roaming usage, camera usage, and combinations thereof.

21. The method according to claim 20 wherein the threshold is set based upon a service plan for the mobile device and the service plan defines the limits of the at least one function for a billing cycle.

22. The method according to claim 20 wherein when the at least one function is selected as voice usage or SMS usage, the restriction of the at least one function is a restriction of communication with a particular phone number.

23. The method according to claim 20 wherein when the at least one function is selected as data usage, the restriction of the at least one function is a restriction of an application.

24. The method according to claim 18 wherein the step of monitoring the at least one function is performed by software located on the mobile device.

25. The method according to claim 24 wherein the software triggers cost, usage, or service availability based notifications.

26. The method according to claim 18 wherein the step of monitoring the at least one function is performed by software located remotely from the mobile device.

27. The method according to claim 26 wherein the software triggers cost, usage, or service availability based notifications.

28. The method according to claim 18 further comprising the steps of:
providing data to the mobile device located in a roaming network from a home network of a carrier;
wherein the data provided to the mobile device includes cost information or roaming related information that must be acknowledged before operation of features of the device on the roaming network is allowed.

29. The method according to claim 18, wherein the plurality of successive thresholds for both voice usage and data usage relate to a voice/data plan service limit, and at least some of the plurality of successive thresholds relate to costs associated with voice or data usage in excess of the voice/data plan service limit.

30. A system for delivering messages to and receiving confirmation of the received message from a mobile device via communication equipment coupled to and sending data to and receiving data from the mobile device, the system comprising:
a monitoring module having a threshold set therein, said monitoring module monitoring data usage of the mobile device, wherein when the threshold is reached for the data usage, said monitoring module generates a notification that is presented on the mobile device;
a server coupled to the communication equipment and having a storage coupled thereto;
wherein the notification requires an acknowledgement thereto such that the data usage functionality of the mobile device is blocked until the acknowledgement is sent, and the acknowledgement is always saved on said storage to generate an audit trail of the acknowledgement.

31. The system according to claim 30, wherein the threshold comprises a plurality of successive thresholds, and when each successive threshold is reached for the monitored usage, said monitoring module generates a respective notification that is presented on the mobile device, wherein the respective notification requires an acknowledgement thereto such that the functionality of the mobile device associated with the respective threshold that has been reached is blocked until the acknowledgement is sent and the acknowledgement to the respective notification is always saved on said storage to generate an audit trail.

32. The system according to claim 31, wherein the threshold relates to a voice/data plan service limit, and the plurality of successive thresholds relate costs associated with voice or data usage in excess of the voice/data plan service limit.

33. The system according to claim 32, wherein at least one of the respective notifications includes cost data.

\* \* \* \* \*